Nov. 17, 1942.   A. L. ARENBERG   2,302,092
ILLUMINATION OF PASSENGER VEHICLES
Filed Dec. 21, 1939   3 Sheets—Sheet 1
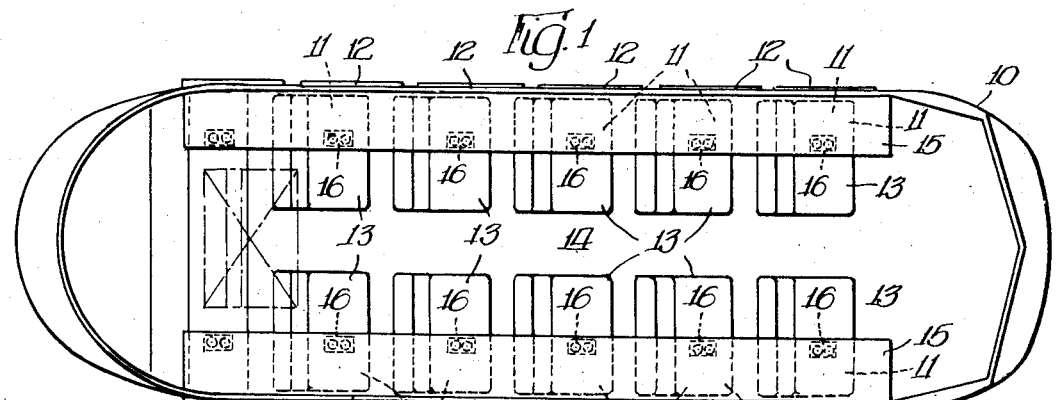
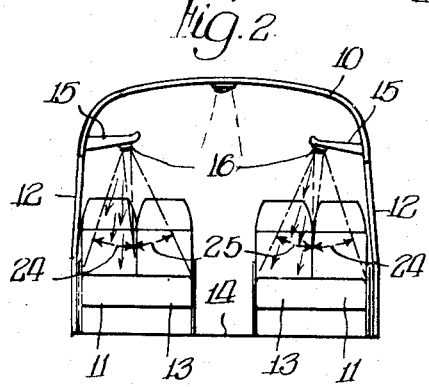
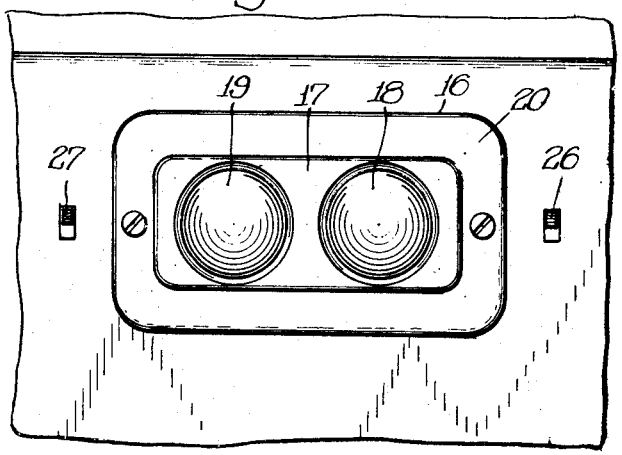
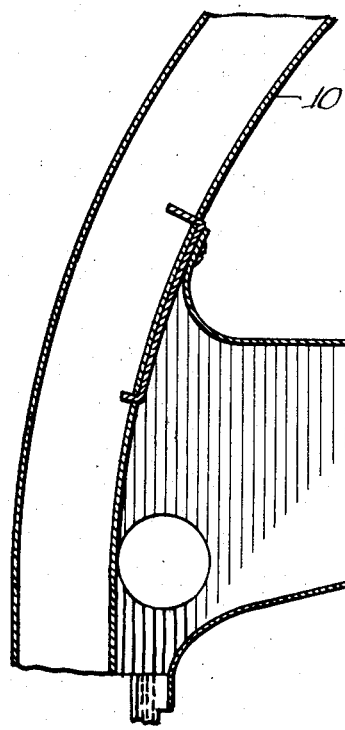
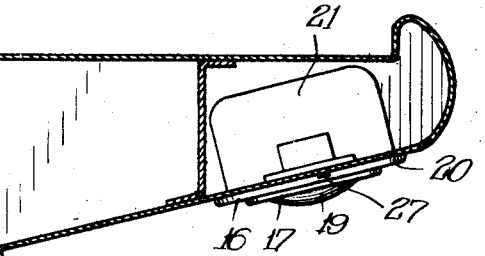
INVENTOR.
Albert L. Arenberg,
BY Cromwell, Greist + Warden.
ATTORNEYS.

Nov. 17, 1942.  A. L. ARENBERG  2,302,092
ILLUMINATION OF PASSENGER VEHICLES
Filed Dec. 21, 1939    3 Sheets-Sheet 2
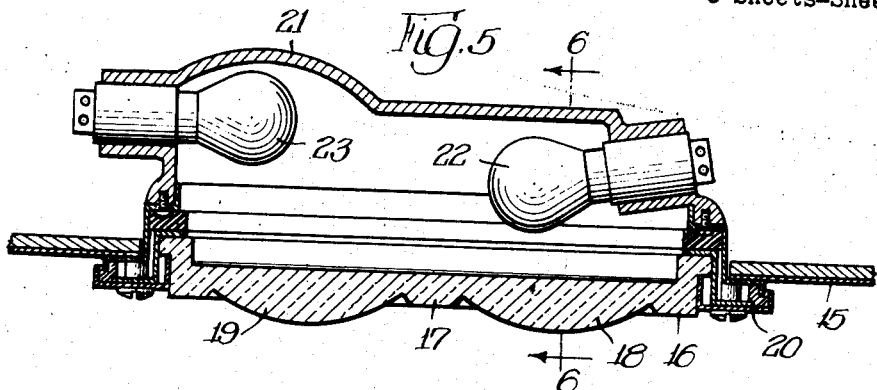
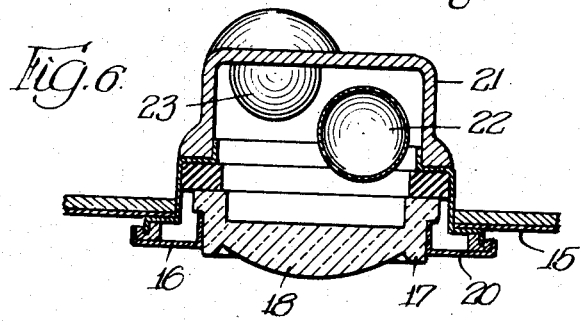
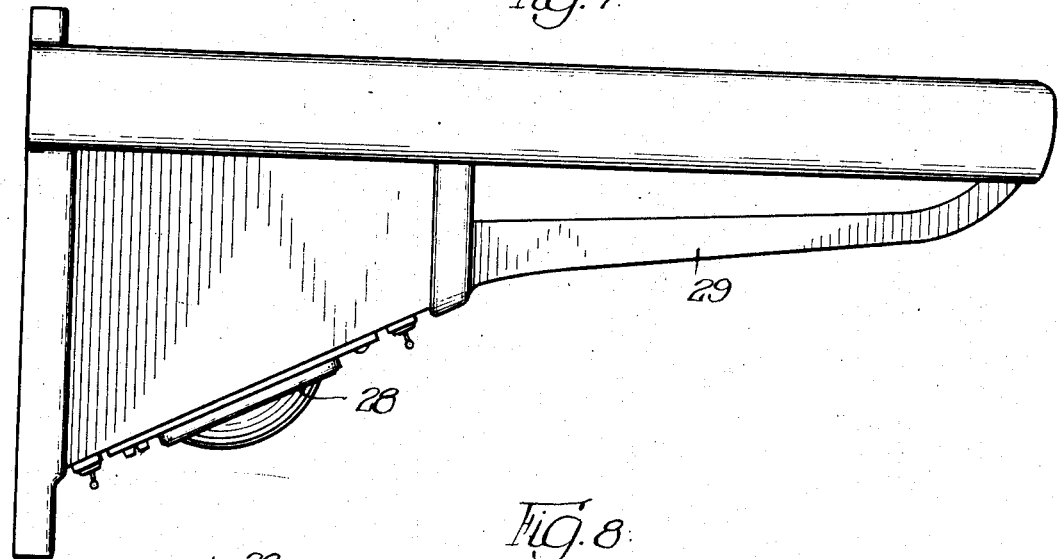
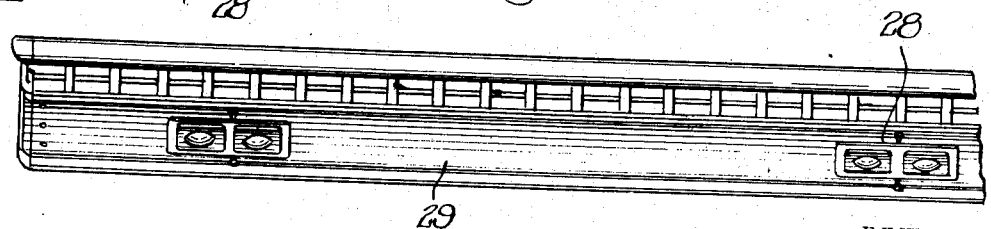
INVENTOR.
Albert L. Arenberg,
BY Cromwell, Greist + Warden
ATTORNEYS.

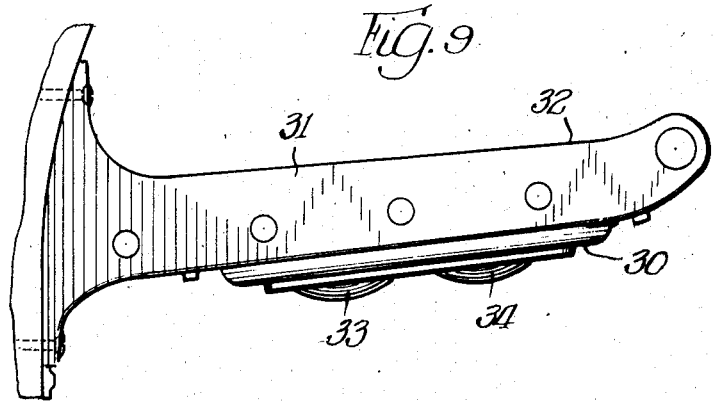
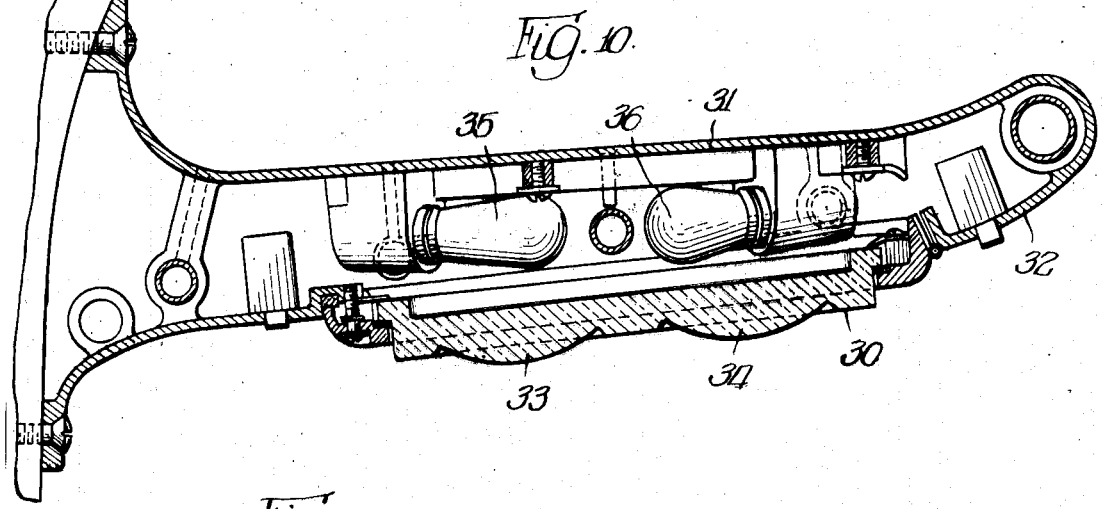
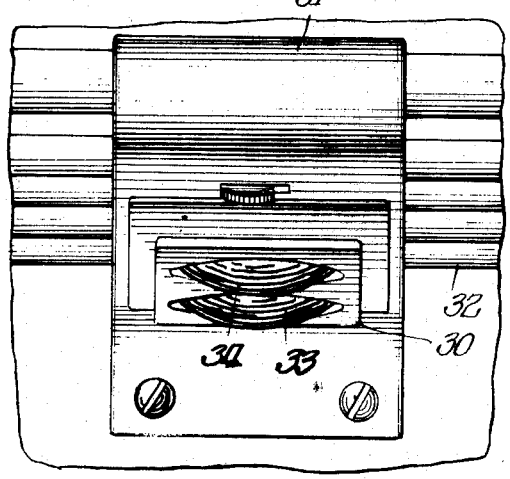
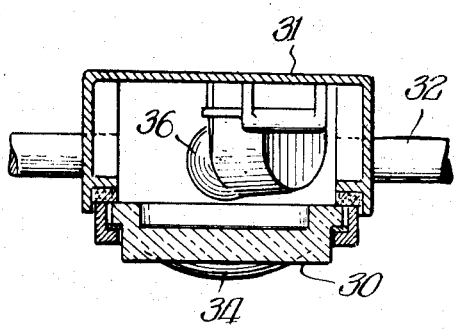

Patented Nov. 17, 1942

2,302,092

UNITED STATES PATENT OFFICE 2,302,092

ILLUMINATION OF PASSENGER VEHICLES

Albert L. Arenberg, Highland Park, Ill., assignor to Patent License Corporation, Chicago, Ill., a corporation of Illinois Application December 21, 1939, Serial No. 310,304

2 Claims. (Cl. 240—7.1)

This invention has to do with the interior illumination of passenger vehicles, such as buses, street cars, railway coaches, airplanes, and the like.

The object of the invention is to provide, in a passenger vehicle, a single lighting unit for the use of either or both of two passengers seated side by side, which unit will give each passenger an individual light, and will enable either passenger, for instance the passenger in the seat next to the window, to turn on his part of the light and read while enabling the other passenger, in the seat next to the aisle, to turn off his part of the light and sit or lie back with his eyes out of the beam feeding the reading plane of the other passenger.

The new unit is characterized by a light transmitting panel which contains two closely arranged clear glass openings, which openings are preferably constructed as condensing lenses, and by separately operated electric bulbs behind the lenses, which bulbs are so arranged with respect to the lenses as to keep the beams separated and direct one beam into one reading plane while directing the other beam onto the other reading plane.

While the foregoing statements are indicative in a general way of the nature of the invention, other more specific objects and advantages will be apparent to those skilled in the art upon a full understanding of the construction, arrangement, operation and manner of use of the new unit.

A few embodiments of the invention are presented herein for the purpose of exemplification, but it will of course be appreciated that the invention is susceptible of incorporation in various other structurally modified forms coming equally within the scope of the appended claims.

In the accompanying drawings:

Fig. 1 is a schematic plan view of a bus interior, showing a number of the lighting units mounted in longitudinally extending rows on the undersides of the luggage racks in positions over the seats;

Fig. 2 is a schematic transverse section through the same bus interior, showing one of the lighting units at one side of the bus with only the window seat part of the light turned on, and showing one of the units at the other side of the bus with only the aisle seat part of the light turned on;

Fig. 3 is a fragmentary bottom plan view of one of the luggage racks, showing one of the units and the two switches used in operating the same;

Fig. 4 is a vertical transverse section through one of the luggage racks, showing one of the units in end elevation;

Fig. 5 is a longitudinal section through a lighting unit constructed in accordance with the invention;

Fig. 6 is a transverse section through the same unit, taken on the line 6—6 of Fig. 5;

Fig. 7 is an end view of another luggage rack equipped with lighting units constructed in accordance with the invention;

Fig. 8 is a side view of the same luggage rack;

Fig. 9 is an end view of still another luggage rack equipped with lighting units constructed in accordance with the invention;

Fig. 10 is a transverse section through the rack shown in Fig. 9, taken at the location of one of the units;

Fig. 11 is a fragmentary side view of the same rack, at the location of one of the units; and Fig. 12 is a transverse section through the unit shown in Fig. 11.

The seating arrangement in the bus 10 shown in Figs. 1 and 2 is more or less conventional. The seats are arranged in pairs crosswise of the bus along both sides of the latter, with one of the seats 11 in each pair next to one of the windows 12 and the other seat 13 in each pair next to the aisle 14. Luggage racks 15 are located above the seats along the sides. The units 16 which form the subject matter of this invention are mounted on the undersides of the racks, with one of the units 16 over each pair of seats 11 and 13. The units, in the particular embodiment shown in Figs. 1 and 2, are located near the edges of the racks, more over the window seats 11 than the aisle seats 13, and are set at a slight angle to the horizontal in conformity with the slope of the undersides of the racks.

Each of the units 16 includes an elongated panel 17 which contains two clear glass light openings. These openings are preferably in the form of condensing lenses 18 and 19. The panel 17, except at the location of the lenses 18 and 19, is preferably translucent and mode of frosted or enameled glass or other suitably treated light diffusing material. The panel 17 is detachably secured by a retaining frame 20 to the bottom of a downwardly opening casing 21. The casing 21 is set back into a recess in the underside of the rack, substantially flush with the edge of the recess, and is secured by any suitable means in that position.

The casing 21 contains two electric light bulbs 22 and 23. These bulbs, instead of being located directly behind the lenses 18 and 19 on lines normal to the centers of the lenses, are each located in a different position with respect to its particular lens, whereby to direct the concentrated light beams produced by the lenses onto the reading planes of the seats 11 and 13 without any undesirable overlapping of the beams at the reading planes. The bulb 22, for instance, is so spaced from its lens 18 and so offset with respect to a line normal to the center of that lens as to produce a concentrated beam 24 of just the right size on only the reading plane of the seat 11, while the bulb 23 is so disposed with respect to its lens 19 as to produce a correspondingly proportioned beam 25 on only the reading plane of the seat 13, all as schematically illustrated in Fig. 2. To accomplish this with best results in the particular embodiment shown, the bulb 22 is preferably offset somewhat to one side of its lens 18, the bulb 23 is preferably offset somewhat to the other side of its lens 19, and the bulb 22 is preferably located nearer to its lens than the bulb 23 is located with respect to its lens. The bulb 22 is operated from a switch 26 at one end of the unit, while the bulb 23 is operated from a switch 27 on the other end of the unit.

In the modification shown in Figs. 7 and 8 the twin lens lighting units 28 are located adjacent the bases of the luggage racks 29, at a proportionately greater inclination to the horizontal.

In the modification shown in Figs. 9, 10, 11 and 12 the lighting units 30 are built into hollow box-like brackets 31 which form the supporting portions of the racks 32. In this particular modification the lenses 33 and 34 are spaced apart in a direction crosswise of the vehicle, instead of longitudinally, with the bulbs 35 and 36 so located with respect to the lenses 33 and 34 as to give the same kind of individual lighting for the seats below the units.

I claim:

1. A twin lens lighting unit for separately illuminating the reading planes of two seats arranged alongside each other, comprising a downwardly opening casing, a panel across the bottom of the casing containing two condensing lenses, and two separately operable electric bulbs in the casing behind the lenses, said bulbs being so differently located with respect to the lenses as to direct narrow individual beams of light at acute angles to each other onto the reading planes of the seats, with the center of each of the reading planes completely out of the beam covering the other reading plane, whereby a passenger in one of the seats may turn on his part of the light and read while a passenger in the other seat may turn off his part of the light and sit or lie back with his eyes completely out of the beam feeding the reading plane of the seat occupied by the first mentioned passenger.

2. A twin lens lighting unit for separately illuminating the reading planes of two seats arranged alongside each other, comprising a downwardly opening casing, a panel across the bottom of the casing containing two condensing lenses, and two separately operable electric bulbs in the casing behind the lenses, said bulbs being so differently located with respect to the lenses as to direct narrow individual beams of light at acute angles to each other onto the reading planes of the seats, with the center of each of the reading planes completely out of the beam covering the other reading plane, whereby a passenger in one of the seats may turn on his part of the light and read while a passenger in the other seat may turn off his part of the light and sit or lie back with his eyes completely out of the beam feeding the reading plane of the seat occupied by the first mentioned passenger, and said panel being light diffusing in the portions thereof surrounding the lenses.

ALBERT L. ARENBERG.